United States Patent
Dehghan Niri et al.

(10) Patent No.: US 9,879,981 B1
(45) Date of Patent: Jan. 30, 2018

(54) SYSTEMS AND METHODS FOR EVALUATING COMPONENT STRAIN

(71) Applicant: General Electric Company, Schenectady, NY (US)

(72) Inventors: Ehsan Dehghan Niri, Schenectady, NY (US); Thomas James Batzinger, Burnt Hills, NY (US); Gregory Lee Hovis, Martinez, GA (US); Kevin Luo, Schenectady, NY (US); Christopher Joseph Lochner, Natick, MA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/367,419

(22) Filed: Dec. 2, 2016

(51) Int. Cl.
  *G01N 3/00* (2006.01)
  *G01B 11/16* (2006.01)
  *G01M 15/14* (2006.01)
  *G01M 5/00* (2006.01)

(52) U.S. Cl.
  CPC .......... *G01B 11/16* (2013.01); *G01M 15/14* (2013.01); *F05B 2270/808* (2013.01); *G01M 5/00* (2013.01)

(58) Field of Classification Search
  CPC ........ G01M 5/00; G01M 15/14; G07C 5/085; F03D 7/043; F05B 2270/332; F05B 2270/808; G01B 11/16
  USPC ......................................................... 73/788
  See application file for complete search history.

(56) References Cited

U.S. PATENT DOCUMENTS

| | | | |
|---|---|---|---|
| 4,528,856 A | 7/1985 | Junker et al. | |
| 4,746,858 A | 5/1988 | Metala et al. | |
| 4,782,705 A | 11/1988 | Hoffmann et al. | |
| 4,859,062 A | 8/1989 | Thurn et al. | |
| 6,078,396 A | 6/2000 | Manzouri | |
| 6,175,644 B1 | 1/2001 | Scola et al. | |
| 6,574,363 B1 | 6/2003 | Classen et al. | |
| 6,983,659 B2 | 1/2006 | Soechting et al. | |
| 6,986,287 B1 | 1/2006 | Dorfman | |
| 7,200,259 B1 | 4/2007 | Gold et al. | |
| 7,227,648 B2 | 6/2007 | Weinhold | |
| 7,414,732 B2 | 8/2008 | Maidhof et al. | |
| 7,421,370 B2 | 9/2008 | Jain et al. | |
| 7,441,464 B2 | 10/2008 | Turnbull et al. | |
| 7,477,995 B2 | 1/2009 | Hovis et al. | |
| 7,490,522 B2 | 2/2009 | Ruehrig et al. | |

(Continued)

FOREIGN PATENT DOCUMENTS

WO  WO 2014/031957  2/2014

*Primary Examiner* — Max Noori
(74) *Attorney, Agent, or Firm* — Dority & Manning, P.A.

(57) ABSTRACT

A system and related methods for evaluating a component using a reference feature and a replicate of the reference feature. The component has an exterior surface with a reference feature thereon. The method includes determining an initial condition of the reference feature, subjecting the component to at least one duty cycle after determining the initial condition, determining a subsequent condition of the reference feature after the at least one duty cycle while the component is in a service position, and forming a replicate of the reference feature while the reference feature is in one of the initial condition or the subsequent condition. One of the initial condition or the subsequent condition may be determined based on the replicate of the reference feature.

25 Claims, 9 Drawing Sheets

(56) References Cited

U.S. PATENT DOCUMENTS

| | | | |
|---|---|---|---|
| 7,533,818 B2 | 5/2009 | Hovis | |
| 7,689,003 B2 | 3/2010 | Shannon et al. | |
| 7,697,966 B2 | 4/2010 | Monfre et al. | |
| 7,719,416 B2 * | 5/2010 | Arms | B64C 27/006 307/151 |
| 7,849,752 B2 | 12/2010 | Gregory et al. | |
| 8,098,247 B2 | 1/2012 | Crucs | |
| 8,245,578 B2 | 8/2012 | Ranson et al. | |
| 8,307,715 B2 | 11/2012 | Ranson | |
| 8,511,182 B2 | 8/2013 | Bjerge et al. | |
| 8,600,147 B2 | 12/2013 | Iliopoulos et al. | |
| 8,818,078 B2 | 8/2014 | Telfer et al. | |
| 8,994,845 B2 | 3/2015 | Mankowski | |
| 9,128,063 B2 | 9/2015 | Dooley | |
| 9,200,889 B2 | 12/2015 | Swiergiel et al. | |
| 9,207,154 B2 | 12/2015 | Harding et al. | |
| 9,292,916 B2 | 3/2016 | Rowe | |
| 9,311,566 B2 | 4/2016 | Iliopoulos et al. | |
| 9,316,571 B2 | 4/2016 | Müller et al. | |
| 2011/0158806 A1 * | 6/2011 | Arms | F03D 1/0658 416/31 |
| 2013/0038930 A1 | 2/2013 | Vent | |
| 2013/0013224 A1 | 6/2013 | Ito et al. | |
| 2013/0194567 A1 | 8/2013 | Wan et al. | |
| 2014/0000380 A1 | 1/2014 | Slowik et al. | |
| 2014/0267677 A1 | 9/2014 | Ward, Jr. et al. | |
| 2015/0239043 A1 | 8/2015 | Shipper, Jr. et al. | |
| 2016/0161242 A1 | 6/2016 | Cook et al. | |
| 2016/0313114 A1 | 10/2016 | Tohme et al. | |
| 2016/0354174 A1 | 12/2016 | Demir | |

* cited by examiner

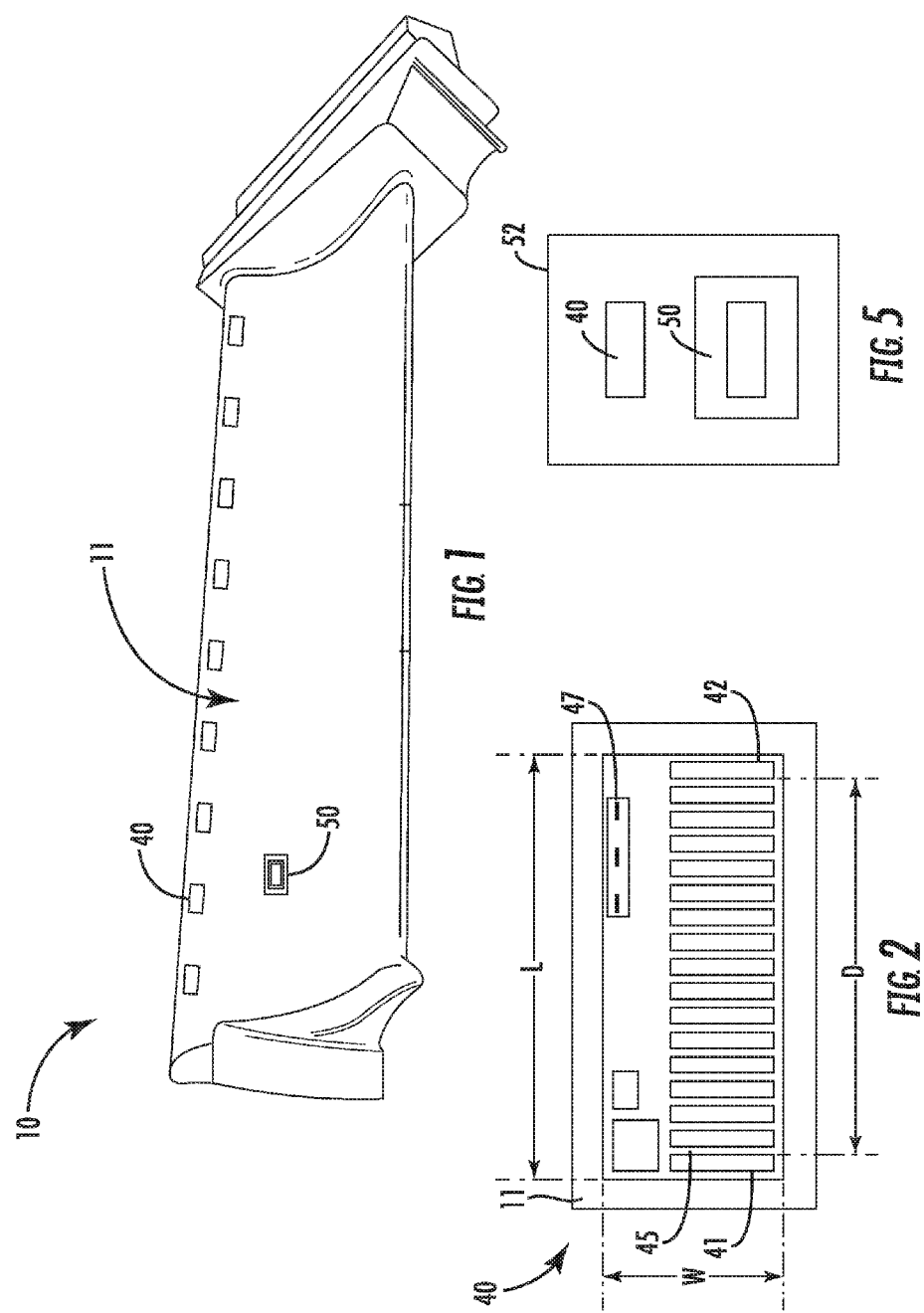

SYSTEMS AND METHODS FOR EVALUATING COMPONENT STRAIN

FIELD

The present disclosure relates generally to systems and methods for evaluating component strain, and more particularly to systems and methods which permit measurements and scans of passive strain indicators positioned on the component while the component remains in a service position.

BACKGROUND

Throughout various industrial applications, apparatus components are subjected to numerous extreme conditions (e.g., high temperatures, high pressures, large stress loads, etc.). Over time, an apparatus's individual components may suffer creep and/or deformation that may reduce the component's usable life. Such concerns might apply, for instance, to some turbomachines.

Turbomachines are widely utilized in fields such as power generation and aircraft engines. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads.

During operation of a turbomachine, various components within the turbomachine and particularly within the turbine section of the turbomachine, such as turbine blades, may be subject to creep due to high temperatures and stresses. For turbine blades, creep may cause portions of or the entire blade to elongate so that the blade tips contact a stationary structure, for example a turbine casing, and potentially cause unwanted vibrations and/or reduced performance during operation.

Accordingly, it is desirable to monitor components for creep. One approach to monitoring components for creep is to configure strain sensors on the components, and analyze the strain sensors at various intervals to monitor for deformations associated with creep strain. However, such deformation can in many cases be on the order of 0.01% of an original dimension, thus requiring specialized equipment for strain monitoring. Such equipment in many cases requires precise calibrations which are not feasible in situ.

For instance, specialized equipment may be used to obtain visual images of the strain sensors, and compare the dimensions of the strain sensors in images taken at varying times for an associated component. Typically, dimensions along two axes can be directly measured in such images, while dimensions along a third axis may be inferred. However, such approaches generally require a direct line of sight to the sensor and component. A great deal of space and disassembly may be required in order to measure the component. As a result, in situ measurements can be difficult, if not impossible with most existing systems.

BRIEF DESCRIPTION

Aspects and advantages of the invention will be set forth in part in the following description, or may be obvious from the description, or may be learned through practice of the invention.

In accordance with one embodiment of the present disclosure, a method for evaluating a component is provided. The component has an exterior surface with a reference feature on the exterior surface. The method includes determining an initial condition of the reference feature, subjecting the component to at least one duty cycle after determining the initial condition, and determining a subsequent condition of the reference feature after the at least one duty cycle, while the component is in a service position. The method also includes forming a replicate of the reference feature while the reference feature is in one of the initial condition or the subsequent condition, wherein one of the step of determining the initial condition of the reference feature or the step of determining the subsequent condition of the reference feature is based on the replicate of the reference feature.

In accordance with another embodiment of the present disclosure, a method for evaluating a component of a turbomachine is provided. The component has an exterior surface with a reference feature on the exterior surface. The method includes determining an initial condition of the reference feature, subjecting the component to at least one duty cycle, applying a mold putty to the component with an injector tool, so that at least a portion of the reference feature is covered by the putty and at least a partial impression of the reference feature is formed in the mold putty, removing the mold putty from the component, and determining a subsequent condition of the reference feature based on the at least partial impression of the reference feature.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of an exemplary component including a passive strain indicator and a replicate thereof in accordance with one or more embodiments of the present disclosure;

FIG. 2 is an overhead view of an exemplary passive strain indicator in accordance with one or more embodiments of the present disclosure;

FIG. 5 is a schematic view of an exemplary replicate of the passive strain indicator and replicate of FIG. 1;

DETAILED DESCRIPTION

Figure 3:
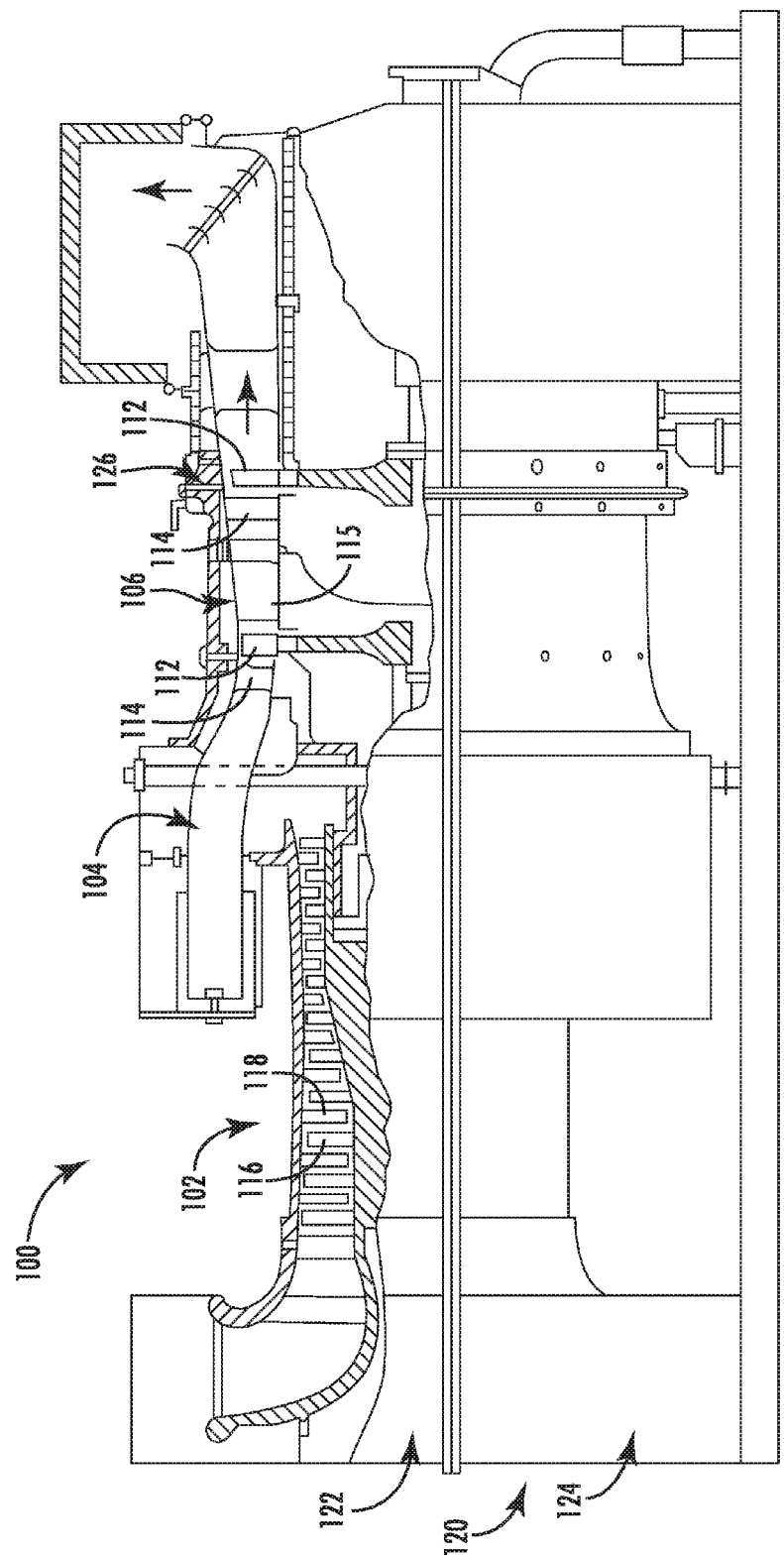
FIG. 3 is a side partial cross-sectional view of a gas turbine in accordance with one or more embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In accordance with one or more embodiments of the present subject matter, a component 10 having an exterior surface 11 with a reference feature 40 on the exterior surface 11 may be evaluated by forming a replicate 50 of the reference feature 40 at at least one time of interest. For example, a relevant time of interest may include at the time of manufacture or another time prior to installing the component 10 in an apparatus and/or placing component 10 in service, or a time after placing the component 10 in service and subjecting the component 10 to at least one duty cycle. Prior to placing component 10 in service, the component 10 and any reference features 40 thereof may be considered as in an initial condition. After placing the component 10 in service and subjecting the component 10 to one or more duty cycles, the component 10 and any reference features 40 thereon may be considered as in a subsequent condition. The condition of the reference feature 40, e.g., the initial condition and/or subsequent condition, may be determined based on the replicate 50 of the reference feature 40, e.g., by analyzing the replicate 50 while the component 10 and the reference feature 40 thereon remain in a service position. As noted above, specialized equipment may be used to analyze passive strain indicators 40 (which are an embodiment of reference features), and the specialized equipment generally may require a great deal of space and disassembly of the apparatus in order to measure the component 10. According to the present subject matter, the replicate 50 may be analyzed with such specialized equipment without having to remove component 10 from the apparatus, such that component 10 may remain in a service position while the replicate 50 is analyzed to determine the condition of the reference feature 40 (e.g., a passive strain indicator).

Additionally, some embodiments may include comparing the condition of the reference feature 40 at different time intervals, e.g., comparing the subsequent condition of the reference feature 40 to the initial condition of the reference feature 40. In other words, exemplary methods may include forming a replicate 50 of the reference feature 40 while the reference feature 40 is in one of the initial condition or the subsequent condition and comparing the replicate 50 of the reference feature 40 to the other of the initial condition of the reference feature or the subsequent condition of the reference feature. For example, some embodiments may include comparing the replicate 50 of the reference feature 40 to the initial condition of the reference feature 40. As a further example, some embodiments may include comparing the replicate 50 of the reference feature 40 to the subsequent condition of the reference feature 40.

Further, some exemplary embodiments may include multiple replicates, such as a replicate 50 of the initial condition of the reference feature 40 and another replicate 50 created while the reference feature 40 is in a subsequent condition. Other exemplary embodiments may include multiple replicates 50 of the same condition, e.g., a first replicate 50 of the reference feature 40 in the subsequent condition and a second replicate 50 of the reference feature 40 in the subsequent condition. In embodiments including multiple replicates 50, characteristics of the multiple replicates 50 may be averaged to avoid or minimize any errors which may result from the replication process. For example, an exemplary method may include scanning the first replicate of the reference feature 40 in the subsequent condition, scanning the second replicate of the reference feature 40 in the subsequent condition, and averaging the results of both scans.

In various exemplary embodiments, the initial condition of the reference feature 40 may be determined by measuring the physical reference feature 40 on the component 10, such as after manufacture of the component 10 and/or the initial condition of the reference feature 40 may be predetermined, for example the component 10 and passive strain indicator 40 thereon may be formed using additive manufacturing processes based on a digital design, and the initial condition of the reference feature 40 may be determined based on the digitally recorded design data. Some exemplary embodiments may include both designing the component 10 to have a predetermined initial condition of the reference feature 40, and determining the initial condition by measuring the condition of the reference feature 40 prior to subjecting the component 10 to at least one duty cycle, such that determining the initial condition may be based on both the measured condition and the predetermined condition. In such embodiments, errors which may arise from either deviations from the design during manufacturing of component 10 or from errors in measuring the component 10 itself may be minimized or negated.

Referring now to FIG. 1, a component 10 is illustrated with a plurality of reference features, in these embodiments passive strain indicators 40, configured on a portion of the component's exterior surface 11. As illustrated, e.g., in FIGS. 1 and 5, at least one replicate 50 of a passive strain indicator 40 may be provided. The component 10 (and more specifically the substrate of the overall component 10) can be any of a variety of types of components used in a variety of different applications, such as, for example, components utilized in high temperature applications (e.g., components including nickel or cobalt based superalloys). In some embodiments, the component 10 may be an industrial gas turbine or steam turbine component such as a combustion component or hot gas path component. In some embodiments, the component 10 may be a turbine blade, compressor blade, vane, nozzle, shroud, rotor, transition piece or casing. In other embodiments, the component 10 may be any other component of a turbine such as any other component for a gas turbine, steam turbine or the like. In some embodiments, the component may be a non-turbine component including, but not limited to, automotive components (e.g., cars, trucks, etc.), aerospace components (e.g., airplanes, helicopters, space shuttles, aluminum parts, etc.), locomotive or rail components (e.g., trains, train tracks, etc.), structural, infrastructure or civil engineering components (e.g., bridges, buildings, construction equipment, etc.), and/or power plant or chemical processing components (e.g., pipes used in high temperature applications).

The component 10 has an exterior surface 11 on or beneath which reference features 40 may be configured. Reference features 40 in accordance with the present disclosure may be configured on the exterior surface 11 using any suitable techniques. For instance, in some embodiments, the reference features 40 may be printed on the exterior surface 11 of the component 10, e.g., by direct ceramic inkjet printing, aerosol jet printing, or another suitable method. In some embodiments, the reference features may be formed on the exterior surface 11 by additive methods including deposition techniques, laser cladding, electro-spark deposition, spot welding, powder-bed printing, or other suitable additive manufacturing techniques. Other exemplary embodiments include but are not limited to subtractive techniques such as laser ablation, engraving, machining, etc.; appearance-change techniques such as annealing, direct surface discoloration, or techniques to cause local changes in reflectivity; mounting of previously formed reference features 40 using suitable mounting apparatus or techniques such as adhering, welding, brazing, etc.; or identifying pre-existing characteristics of the exterior surface 11 that can function as the components of a reference features 40. Additionally, in further alternative embodiments, reference features 40 can be configured beneath exterior surface 11 using suitable embedding techniques during or after manufacturing of the component 10.

As illustrated for example in FIG. 2, the reference feature 40 generally includes at least two reference points 41 and 42 that can be used to measure a distance D between said at least two reference points 41 and 42 at a plurality of time intervals. As should be appreciated by those skilled in the art, these measurements can help determine the amount of strain, strain rate, creep, fatigue, stress, etc. at that region of the component 10, e.g., reference feature 40 may be a passive strain indicator. The at least two reference points 41 and 42 can be disposed at a variety of distances and in a variety of locations depending on the specific component 10 so long as the distance D therebetween can be measured. Moreover, the at least two reference points 41 and 42 may be dots, lines, circles, boxes or any other geometrical or non-geometrical shape so long as they are consistently identifiable and may be used to measure the distance D therebetween.

FIGS. 1 and 2 illustrate an exemplary embodiment wherein a passive strain indicator 40 (which is an embodiment of a reference feature) is a two-dimensional passive strain indicator configured on, e.g., adhered to or printed on, a portion of the exterior surface 11 of the component 10. The example component 10 embodiment shown in FIG. 1 is a turbine component, more particularly a turbine blade. However, the component 10 can be or include various additional or alternative components, as described above.

The passive strain indicator 40 may have a variety of different configurations and cross-sections such as by incorporating a variety of differently shaped, sized, and positioned reference points 41 and 42. For example, the passive strain indicator 40 may include a variety of different reference points having various shapes and sizes. Such embodiments may provide for a greater variety of distance measurements D such as between the outermost reference points (as illustrated), between two internal or external reference points, or any combination therebetween. The greater variety may further provide a more robust strain analysis on a particular portion of the component 10 by providing strain measurements across a greater variety of locations.

Furthermore, the dimensions of the passive strain indicator 40 may depend on, for example, the component 10, the location of the passive strain indicator 40, the targeted precision of the measurement, application technique, and optical measurement technique. For example, in some embodiments, the passive strain indicator 40 may have a length L and width W ranging from less than 1 millimeter to greater than 300 millimeters. Moreover, the passive strain indicator 40 may have any thickness that is suitable for application and subsequent optical identification/measurement without significantly impacting the performance of the underlying component 10. Notably, this thickness may be a positive thickness away from the surface 11 (such as when additive techniques are utilized) or a negative thickness into the surface 11 (such as when subtractive techniques are utilized). For example, in some embodiments, the passive strain indicator 40 may have a thickness of less than from about 0.01 millimeters to greater than 1 millimeter. In some embodiments, the passive strain indicator 40 may have a substantially uniform thickness. Such embodiments may help facilitate more accurate measurements for subsequent strain calculations between the first and second reference points 41 and 42.

In optional embodiments, the passive strain indicator 40 may include a positively applied square or rectangle wherein the first and second reference points 41 and 42 define two opposing sides of said square or rectangle. In some embodiments, the passive strain indicator 40 may include at least two applied reference points 41 and 42 separated by a negative space 45 (i.e., an area in which the passive strain indicator material is not applied). The negative space 45 may be, for example, an exposed portion of the exterior surface 11 of the component 10. Alternatively or additionally, the negative space 45 may be a subsequently applied contrasting (i.e. visually contrasting, contrasting in the ultraviolet or infrared spectrum, or contrasting in any other suitable range of wavelengths in the electromagnetic spectrum) material that is distinct from the material of the at least two reference points 41 and 42 (or vice versa).

As illustrated in FIG. 2, in some embodiments, the passive strain indicator 40 may include a unique identifier 47 (hereinafter "UID"). The UID 47 may comprise any type of barcode, label, tag, serial number, pattern or other identifying system that facilitates the identification of that particular passive strain indicator 40. In some embodiments, the UID 47 may additionally or alternatively comprise information about the component 10 or the overall assembly that the passive strain indicator 40 is configured on. The UID 47 may thereby assist in the identification and tracking of particular passive strain indicators 40, components 10 or even overall assemblies to help correlate measurements for past, present and future operational tracking.

Figure 4:
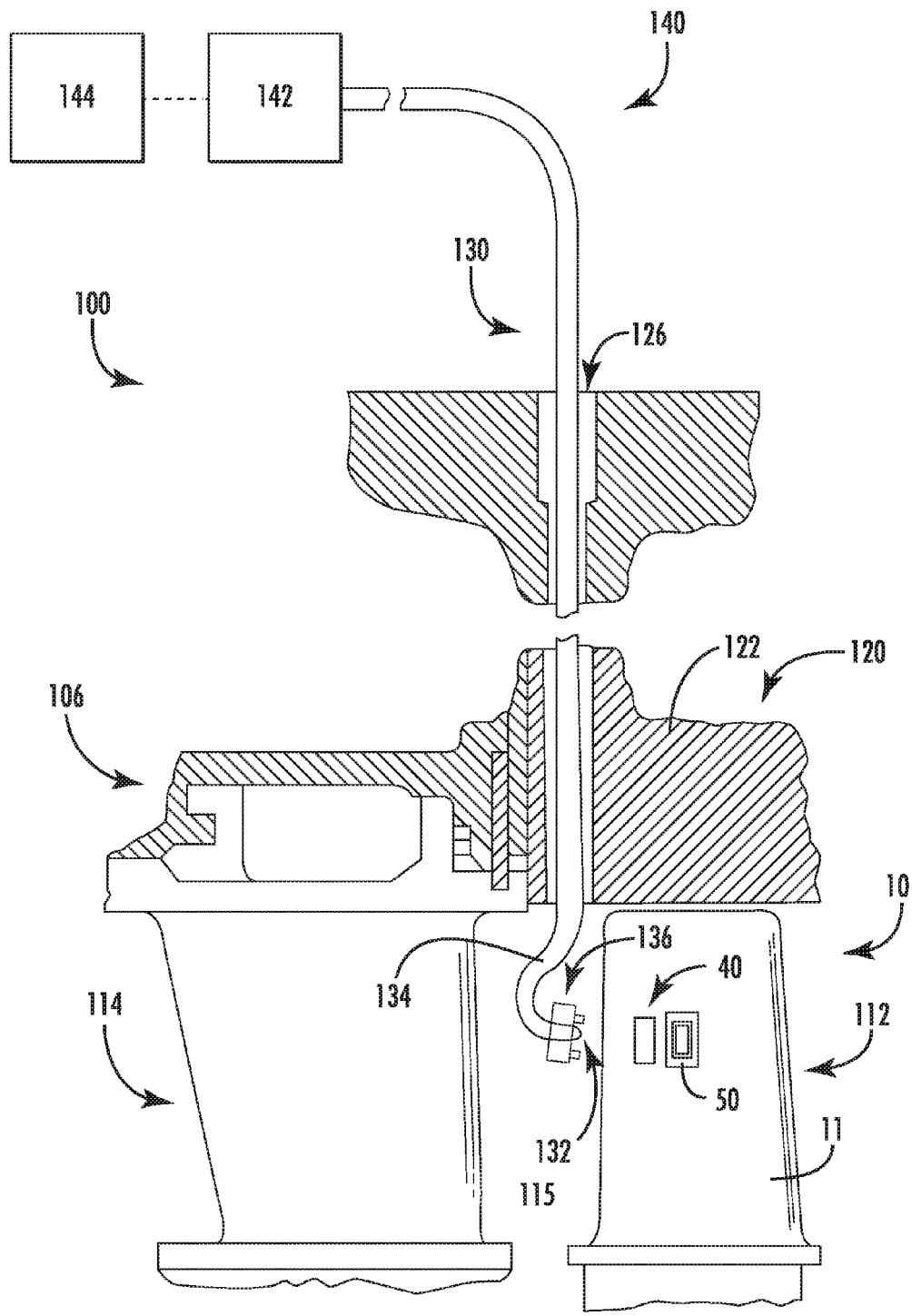
FIG. 4 is a cross-sectional view of a portion of a gas turbine in accordance with one or more embodiments of the present disclosure.
Figures 6, 7:
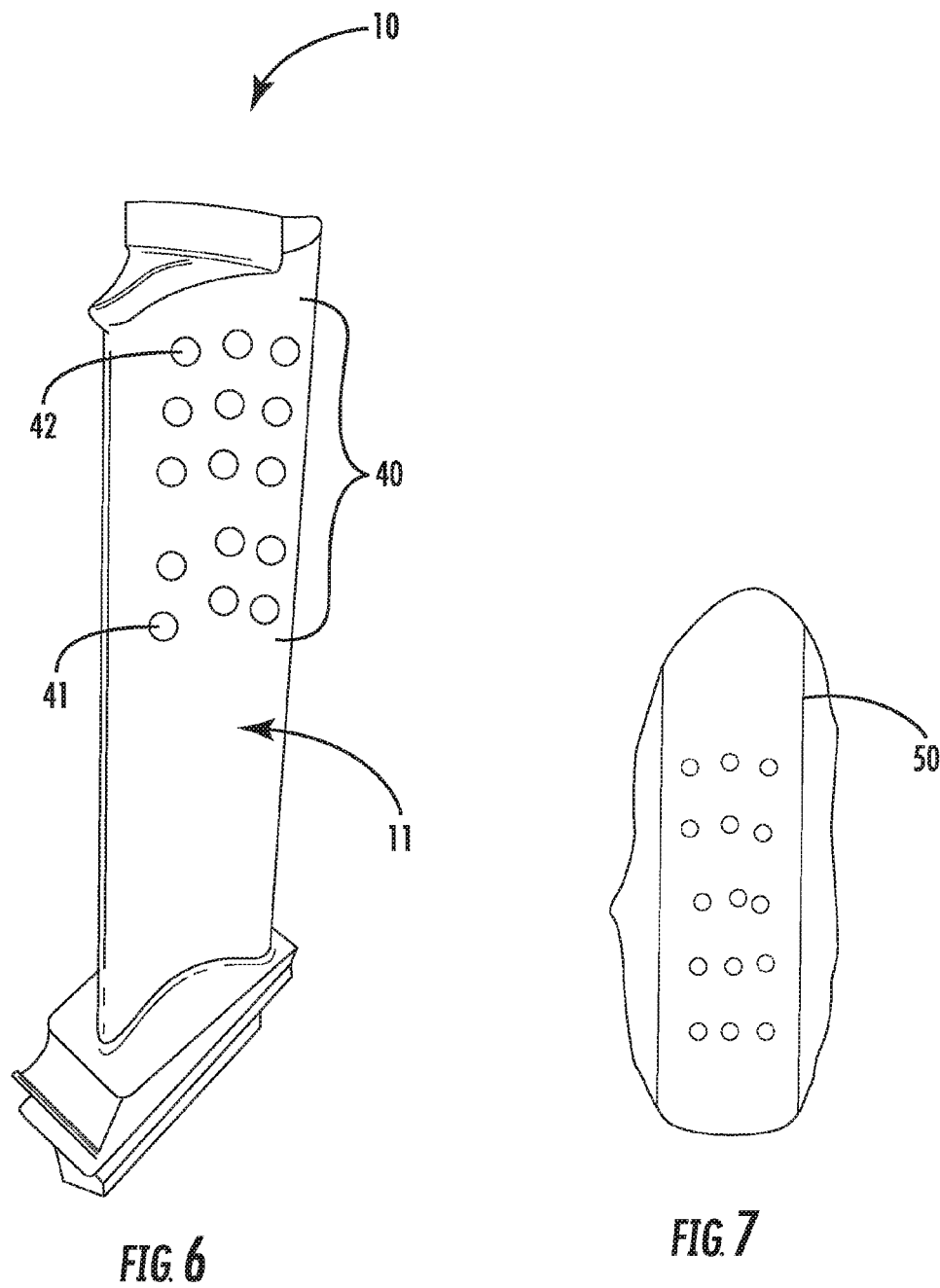
FIG. 6 is a perspective view of an exemplary component including a passive strain indicator in accordance with one or more embodiments of the present disclosure.
FIG. 7 is a view of an exemplary replicate of the passive strain indicator of FIG. 5.

Referring now to FIGS. 3 and 4, a component 10 (with one or more surface features 40 configured thereon) may be disposed for operation within a turbomachine (an embodiment of an apparatus), such as a gas turbine 100 as illustrated, steam turbine, or other turbomachine. Gas turbine 100 may include a compressor section 102, a combustor section 104, and a turbine section 106. Generally, the compressor section 102 provides a flow of pressurized air to the combustor section 104 wherein the pressurized air is mixed with fuel and the mixture combusted to generate a working fluid or hot gas stream. The working fluid is flowed through the turbine section 106, causing rotation of various rotatable components within the turbine section 106, which in turn drives the compressor section 102 (and rotation of various rotatable components thereof). As shown, the turbine section 106 includes one or more stages of rotor blades 112 and stator vanes 114 which extend radially across a hot gas stream flow annulus 115. Compressor section 102 additionally includes one or more stages of rotor blades 116 and stator vanes 118. A casing 120 extends around and encloses the compressor section 102, combustor section 104 and turbine section 106. As illustrated, the casing 120 may be formed from two or more sections. In the embodiment shown, the casing includes a first shell 122 and a second shell 124 which form the casing 120.

The casing 120 may include defined therein one or more access ports 126 to permit periodic inspection of components of the gas turbine 100 disposed internally of the casing 120 using a borescope 130. As is generally understood, during operation of the gas turbine each of the ports 126 is closed by a suitable plug.

Borescope 130 may extend through an access port 126 of the gas turbine casing 120 for inspection of components of the gas turbine 100. The borescope 130 may generally include a lens 132 and a suitable optical system for transmitting images 50 (images 50 being example embodiments of replicates 50) therethrough to a processor, as discussed herein. The optical system may be contained within a body 134 of the borescope, which may for example be generally flexible and movable within the gas turbine casing 120 to facilitate viewing of the various components of the gas turbine 100. A collar 136 may surround a portion of the body 134, such as proximate the lens 132. The collar 136 may support alignment features as discussed herein.

Borescope 130 may be a component of a data acquisition device 140, which may generally be utilized to analyze surface features 40. A data acquisition device 140 may, for example, include borescope 130, an image capture device 142 and a computing device 144. The image capture device 142 may generally be in communication with the lens 132 and optical system for receiving and processing light from the lens 132 to generate images. In exemplary embodiments, for example, image capture device 142 may be a camera sensor which receives and processes light from a camera lens to generate images, such as digital images, as is generally understood.

Image capture device 142 may be in communication with computing device 144. Computing device 144 may generally include suitable hardware and/or software for storing and analyzing the images from the image capture device 142 and device 140 generally. Such hardware and/or software may, for example, generally analyze surface features. For example, passive strain indicators 40 may be analyzed to determine whether deformation and strain have occurred as discussed above.

Computing device 144 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor may also include various input/output channels for receiving inputs from and sending control signals to various other components with which the processor is in communication, such as the scanner 60. The processor may further include suitable hardware and/or software for storing and analyzing inputs and data from the scanner 60 and for generally performing method steps, as described herein. Additionally, the memory device(s) may generally be memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the computing device 144 to perform various functions.

In alternative embodiments, other suitable data acquisition devices, such as electrical field scanners or devices which include other suitable imaging apparatus, may be utilized.

Notably, analysis of a component 10 (such as a rotor blade 112, 116 or other suitable component as discussed herein) by a data acquisition device 140 may, in some embodiments, be performed when the component 10 is in situ, which may also be referred to as in a service position. A component 10 is in a service position when it is disposed within an assembly such as a turbomachine, such as within a section 102, 104, 106 of the gas turbine 100. Notably, in some embodiments the entire casing 120 may surround the component 10 when such in situ analysis is occurring. In these embodiments, analysis may occur via extension of a portion of the data acquisition device 140, such as a portion of the borescope 130 including the lens 132, through a port 126.

In some embodiments, data acquisition device 140 and in particular, image capture device 142 and computing device 144 thereof, may be operable to create a replicate 50 of one or more of the indicators 40. In such embodiments, the replicate 50 may be an image 50 of the indicator 40, which may be, e.g., a digital image or a physical printout of the image. For example, in some embodiments, the image 50 may be an image of the indicator in an initial condition, e.g., as manufactured and/or prior to placing the component 10 in service and subjecting the component 10 to at least one duty cycle. In such embodiments, the initial condition of the indicator 40 may be determined based on the image 50 of the indicator, e.g., by analyzing the image 50 which may include determining the initial distance D between reference points 41 and 42.

In other embodiments, the image 50 may be analyzed to determine a change in reference points 41 and 42 from the initial condition to a subsequent condition, without measuring the absolute distance between reference points 41 and 42. For example, such embodiments may include comparing an initial condition of reference point 41 to a subsequent condition of reference point 41 and/or comparing an initial condition of reference point 42 to a subsequent condition of reference point 42, without regard to the distance D between reference points 41 and 42.

After placing the component 10 in service and subjecting the component 10 to at least one duty cycle, a subsequent condition of the indicator 40 may be determined. In some embodiments, the subsequent condition of the indicator 40 may be determined while the component 10 is in a service position using borescope 130 as described above. For example, the indicator 40 may be analyzed in situ by viewing and/or analyzing the indicator 40 via the borescope 130 to determine the subsequent condition of the indicator 40 and comparing the subsequent condition of the indicator 40 to a digitally-stored image 50 of the initial condition of the indicator 40.

As another example, which is illustrated in FIG. 4, forming the replicate 50 may include forming the replicate 50 of the reference feature 40 in the initial condition prior to the step of subjecting the component 10 to at least one duty cycle. Further in such exemplary embodiments, determining the subsequent condition of the reference feature 40 may include placing the replicate 50 proximate to the reference feature 40 and creating an image 52 of the reference feature 40 and the replicate 50. As illustrated, the replicate may be an image 50 and the reference feature may be indicator 40. In such exemplary embodiments, image 50 of the initial condition of the indicator 40 may be placed proximate to the indicator 40 while the component is in a service position, e.g., installed in an apparatus. Further, image 50 may be placed proximate to the indicator 40 at a time when the indicator 40 is in the subsequent condition, e.g., after at least one duty cycle. In such embodiments, data acquisition device 140 may create an image 52 (FIG. 5) of the indicator 40 and the replicate 50, where indicator 40 is in the subsequent condition in image 52 and the replicate 50 depicts or reproduces the initial condition of the indicator 40. In this example, the subsequent condition of the indicator 40 may be determined based on the image 52, and may also be compared to the initial condition of the indicator 40 based on the image 52, e.g., by comparing the replicate 50 to the indicator 40 based on the image 52 of the indicator 40 and the replicate 50. In some embodiments, such comparison may include analyzing the image 52 for any change in one or both of reference point 41 and reference point 42. Some embodiments may include comparing the replicate 50 to the indicator 40 based on the image 52 by analyzing the image 52 to determine initial and subsequent values for distance D. Determining the condition of the indicator 40 based on the image 52 may advantageously avoid or minimize the need for calibration because both the initial condition and the subsequent condition are captured in the same image 52, such that the same features and noise will be present in each condition.

Turning now to FIGS. 6 through 9, in some exemplary embodiments, the strain sensor 40 may include reference points 41 and 42 which are defined by elevated marker surfaces. Further in such embodiments, the replicate 50 may be a three-dimensional replicate which captures the elevated surfaces on which reference points 41 and 42 are defined as well as a portion of the exterior surface 11. As illustrated for example in FIG. 7, embodiments of a three-dimensional replicate 50 may include a mold formed with a putty material where the mold includes an impression of the indicator 40 therein. In some exemplary embodiments wherein the replicate is an impression 50, forming the replicate 50 may include forming an impression 50 of the reference feature 40 in a putty 214 while the reference feature 40 is in the initial condition prior to subjecting the component 10 to at least one duty cycle. In this embodiment the indicator geometry can be replicated and transferred out of the turbine for further precise measurement in the lab.

Figure 8:
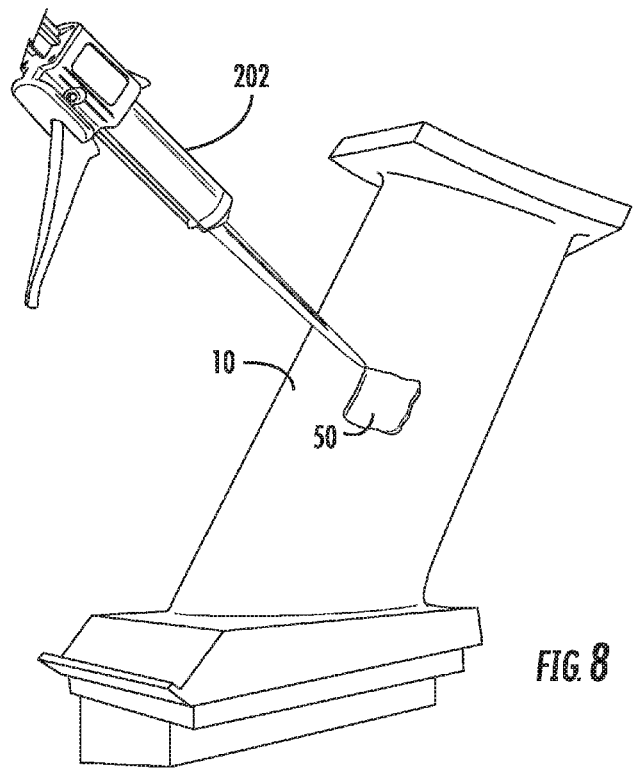
FIG. 8 is a perspective view of an exemplary apparatus for forming a replicate of the passive strain indicator of FIG. 6.

In various embodiments, the putty may be a rigid putty or a flexible putty. For example, in embodiments where the putty is relatively rigid, the impression (which is an example embodiment of a replicate) 50 can be formed when the indicator 40 is in the initial condition, and the material may be sufficiently rigid that the impression 50 will retain the shape of the initial condition of the indicator 40. FIG. 8 illustrates an example embodiment wherein the impression 50 may be formed prior to installing the component 10 into an apparatus, e.g., before the component is in a service position, using an injector tool 202. Further in such exemplary embodiments, after the component 10 has been subjected to at least one duty cycle, determining the subsequent condition of the reference feature 40 may include determining whether the reference feature 40 fits the replicate 50 (e.g., an impression 50 formed in a rigid mold). For example, the impression 50 may be placed on top of or otherwise physically superimposed on the indicator 40 to determine if the reference points 41 and 42 are still in the same position and/or still spaced apart by the same relative distance D. In other words, if the rigid mold still fits over the indicator 40 after at least one duty cycle, it may be determined that the component 10 has not experienced significant creep or other deformation and thus the component 10 may continue to be used, e.g., the rigid mold may be used to perform a Go/No-Go test. Accordingly, one of ordinary skill in the art would understand that "rigid" as used herein in the context of a rigid putty material for forming an impression 50 according to such embodiments must be sufficiently rigid to retain its shape over time and sufficiently rigid to not deform to accommodate the subsequent condition of the indicator 40 if the indicator 40 has changed from its initial condition. For example, in such embodiments, a putty material would be considered flexible and not rigid if the mold impression 50 formed therein would bend or deform when placed over indicator 40 after reference points 41 and 42 have changed shape and/or position during use of the component 10.

Figure 9:
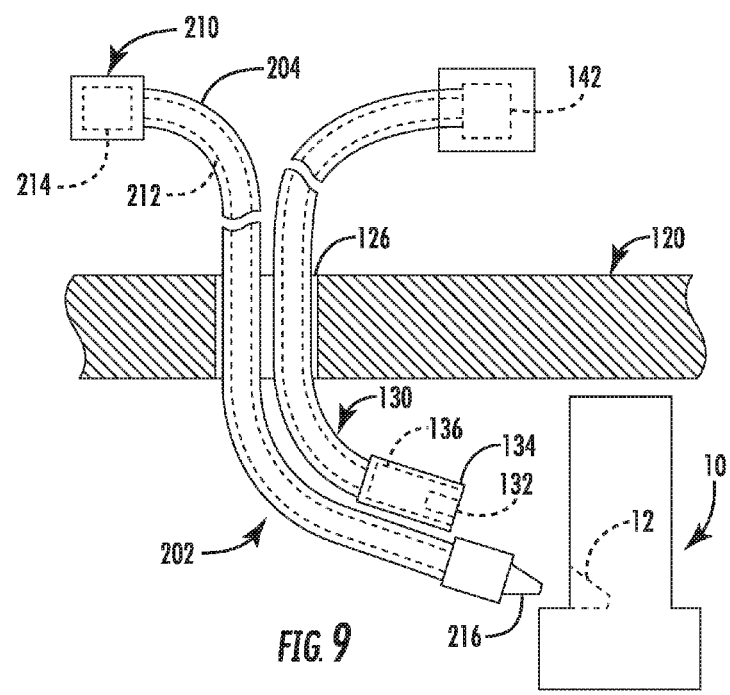
FIG. 9 is a partial section view of another exemplary apparatus for forming a replicate of the passive strain indicator of FIG. 6.

In additional embodiments where the replicate 50 is a mold impression, the impression 50 of the indicator 40 can be formed while the indicator 40 is in the subsequent condition. For example, as illustrated in FIG. 9, a borescope device 130 may include an injector tool 202 attached to the borescope device 130, thus, some exemplary methods may include using borescope device 130 to apply the mold putty while the component 10 is in a service position. An image capture device 142 on the borescope device may be used to identify and locate a target area 12 of the component 10 for analysis, where the target area 12 includes at least a portion of the indicator 40, and the injector tool 202 may be used to apply a mold putty to the component 10, and in particular to the target area 12 on the component 10 to form an impression 50 of the indicator 40 (or at least a part of the indicator 40). In the illustrative example of FIG. 9, the borescope device 130 and the injector tool 202 attached thereto are inserted through access port 126 in casing 120. The exemplary embodiment of an injector tool 202 illustrated in FIG. 9 includes a storage volume 210 within which a quantity of putty 214 may be stored. The storage volume 210 may be in communication with a nozzle 216 via a lumen 212 defined in a tubular body 204 of the injector tool 202. The nozzle 216 may be placed on or near the target area 12 to apply putty 214 to the target area 12 of component 10.

Such exemplary embodiments permit determining the subsequent condition of the reference feature 40 by directly measuring the replicate 50 using a three-dimensional data acquisition device. Directly measuring the replicate 50 using a three-dimensional data acquisition device generally includes directly measuring the reference features along an X-axis, a Y-axis and a Z-axis to obtain X-axis data points, Y-axis data points, and Z-axis data points and create accurate 3D digital replications of the topology of surface 11 from the data points. The X, Y, and Z axes are mutually orthogonal. For example, the replicate 50 may be scanned with a three-dimensional data acquisition device, e.g., an optical scanner such as a structured light scanner or any other suitable type of optical scanner which is capable of directly acquiring or measuring data in three dimensions. Some exemplary embodiments may further include comparing the subsequent condition of the reference feature 40 to the initial condition of the reference feature 40 by comparing the three-dimensional data, e.g., scan, of the replicate 50 to the initial condition of the reference feature.

In general, any suitable three-dimensional data acquisition device which utilizes surface metrology techniques to obtain direct measurements in three dimensions may be utilized. In exemplary embodiments, such three-dimensional data acquisition device is a non-contact device which utilizes non-contact surface metrology techniques. Further, in exemplary embodiments, a three-dimensional data acquisition device in accordance with the present disclosure has a resolution along each of three mutually orthogonal axes, X, Y, and Z, between approximately 100 nanometers and approximately 100 micrometers. Accordingly, and in accordance with exemplary methods, the X-axis data points, Y-axis data points, and Z-axis data points are obtained at resolutions of between approximately 100 nanometers and approximately 100 micrometers.

Alternatively, other suitable data acquisition devices may be utilized, such as a laser scanner. Laser scanners generally include lasers which emit light in the form of laser beams towards objects, such as in these embodiments reference features 40 and turbine components 10 generally. The light is then detected by a sensor of the data acquisition device. For example, in some embodiments, the light is then reflected off of surfaces which it contacts, and received by a sensor of the device. The round-trip time for the light to reach the sensor is utilized to determine measurements along the various axes. These devices are typically known as time-of-flight devices. In other embodiments, the sensor detects the light on the surface which it contacts, and determines measurements based on the relative location of the light in the field-of-view of the sensor. These devices are typically known as triangulation devices. X-axis, Y-axis and Z-axis data points are then calculated based on the detected light, as mentioned. Notably, in exemplary embodiments a processor performs and operates such data acquisition devices to perform various above disclosed steps.

In some embodiments, the light emitted by a laser is emitted in a band which is only wide enough to reflect off a portion of object to be measured, such as the plurality of reference features 40. In these embodiments, a stepper motor or other suitable mechanism for moving the laser may be utilized to move the laser and the emitted band as required until light has been reflected off of the entire object to be measured.

Still further, other suitable three-dimensional data acquisition devices may be utilized. Alternatively, however, the present disclosure is not limited to the use of three-dimensional data acquisition devices. For example, and in particular in embodiments wherein the reference features 40 and/or replicates 50 are two-dimensional, as discussed above and illustrated in, e.g., FIGS. 1, 2, 4, and 5.

Figure 10:
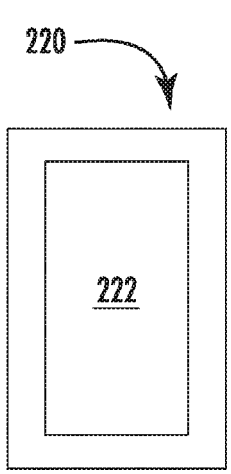
FIG. 10 is an end view of a shell of an exemplary apparatus for forming a replicate of the passive strain indicator of FIG. 6.
Figure 11:
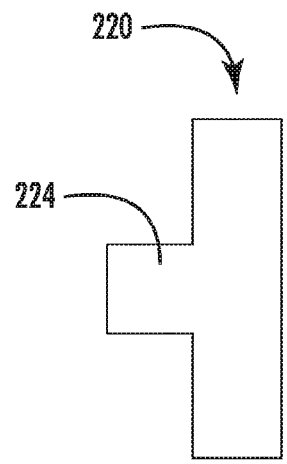
FIG. 11 is a side view of the shell of FIG. 10.
Figure 12:
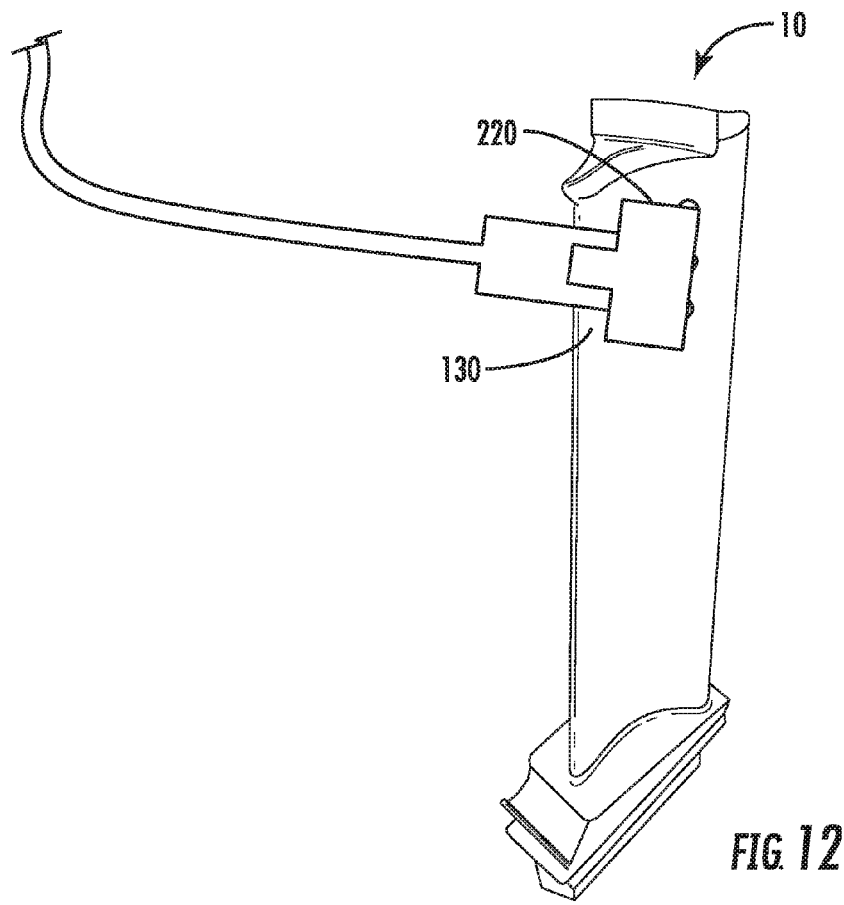
FIG. 12 is a perspective view of an exemplary apparatus for forming a replicate of a passive strain indicator, the apparatus including the shell of FIG. 10.

In some embodiments, for example as illustrated in FIGS. 10-12, a shell 220 may be provided. As may be seen for example in FIG. 10, the shell 220 may include an interior cavity 222. As may be seen for example in FIG. 11, the shell 220 may include a handle 224, e.g., for engagement by borescope device 130 or a robotic arm. The borescope device may be used to attach the shell 220, to the target area 12. In some embodiments, the shell 220 may be a pre-made shell 220 that conforms to the geometry of the target area 12. In some embodiments, the shell 220 may include an adhesive disposed within interior cavity 222 that attaches the shell 220 to the putty 214. Borescope device 130 and shell 220 may be used to apply pressure to the putty 214 to allow the putty 214 to cure after application of putty 214 to target area 12. Such pressure and optional adhesive may allow the putty 214 to stick to the shell 220. Once the putty 214 has cured, it may be peeled off of the component 10 and removed with the borescope device 130. Accordingly an impression 50 of reference points 41 and 42 may be formed in the putty 214 contained within shell 220.

Figure 13:
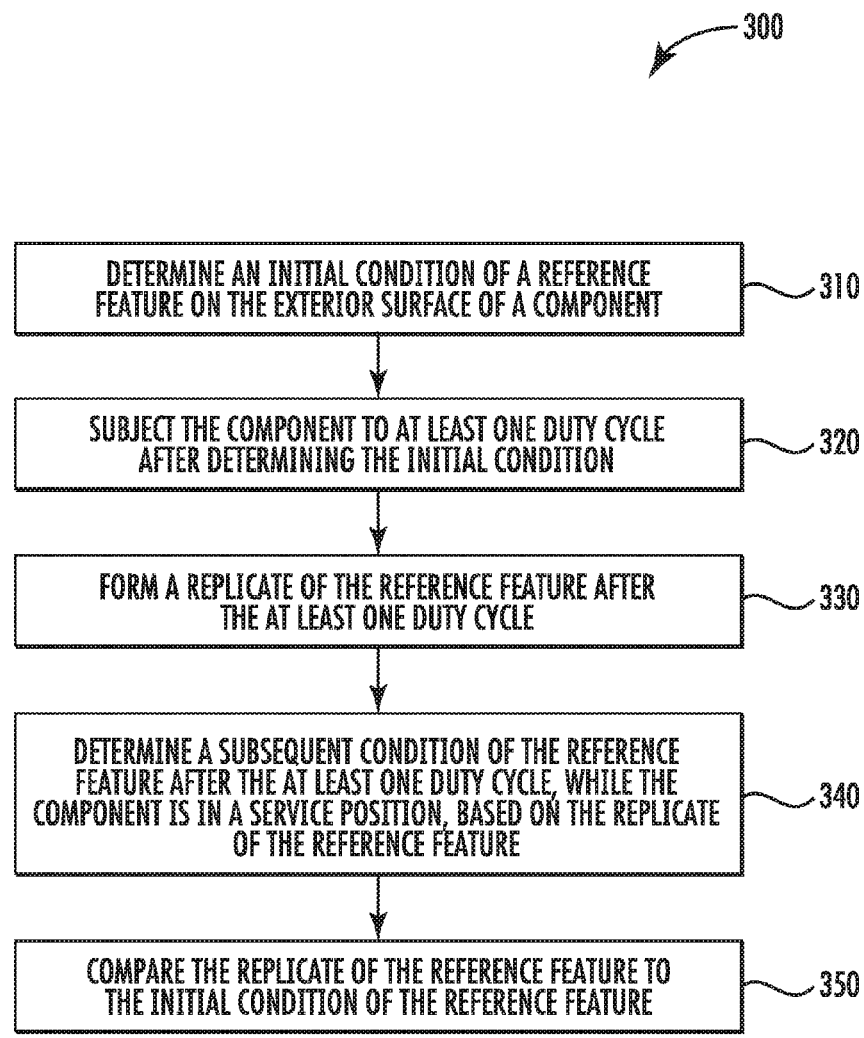
FIG. 13 is a flow chart illustrating a method for evaluating a component in accordance with one or more embodiments of the present disclosure.

Referring now to FIG. 13, an exemplary method 300 of evaluating a component 10, wherein the component 10 has an exterior surface 11 with a reference feature 40 on the exterior surface 11, is illustrated. For example, as discussed above, passive strain indicator 40 is an exemplary embodiment of the reference feature. The exemplary method 300 includes determining an initial condition of the reference feature 40 at step 310 and subjecting the component 10 to at least one duty cycle after determining the initial condition at step 320. Method 300 further includes forming a replicate 50 of the reference feature 40 after the at least one duty cycle at step 330. As discussed above, the replicate 50 may, in various embodiments, include a two-dimensional replicate of the reference feature 40, such as a photograph or other two-dimensional image, or a three-dimensional replicate of the reference feature 40, such as an impression formed in a putty mold or a three-dimensional digital image, e.g., a wireframe model or polygonal mesh. For example, a digital laser scanner may be used to create a three-dimensional image of the reference feature 40. Method 300 further includes determining a subsequent condition of the reference feature 40 after the at least one duty cycle, while the component 10 is in a service position, based on the replicate 50 of the reference feature 40 at step 340. For example, in various embodiments, the replicate 50 may be a two-dimensional image of the reference feature 40 from which various characteristics of the reference feature 40, such as distance D, may be determined in order to determine the subsequent condition of the reference feature 40 based on the replicate 50. In other exemplary embodiments, replicate 50 may be, e.g., an impression of the reference feature 40, wherein the impression may be scanned such as with a laser scanner or structured light scanner to determine the subsequent condition of the reference feature 40 based on the impression 50. Thus, component 10 may remain in a service position while the image, impression, or other embodiment of a replicate 50 is evaluated. In at least some embodiments, method 300 may include a step 350 of comparing the replicate 50 of the reference feature 40 to the initial condition of the reference feature 40. In such embodiments, the replicate 50 represents the subsequent condition of the reference feature 40 and may be compared to the previously determined initial condition of the reference feature 40, e.g., to evaluate any stress, strain, and/or possible deformation of the component 10 resulting from the at least one duty cycle.

Figure 14:
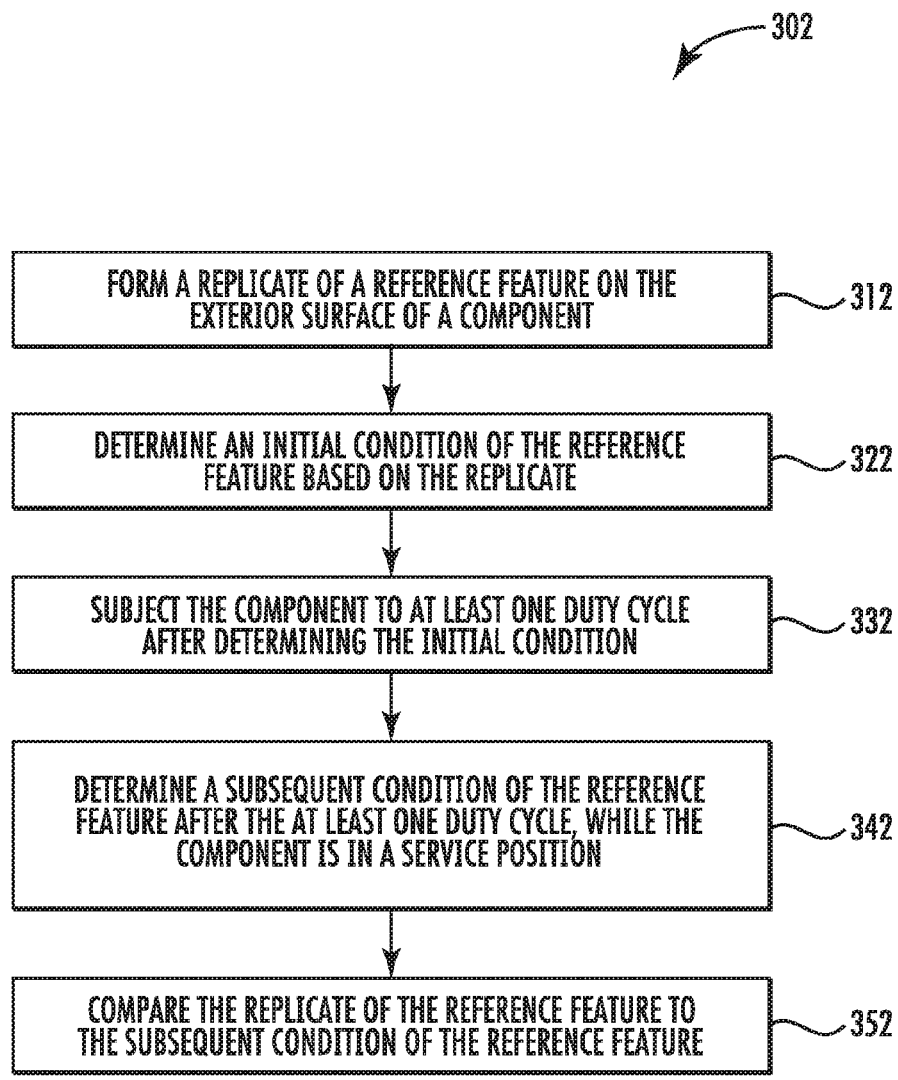
FIG. 14 is a flow chart illustrating a method for evaluating a component in accordance with one or more embodiments of the present disclosure.

FIG. 14 illustrates another exemplary method 302 of evaluating a component 10, wherein the component 10 has an exterior surface 11 with a reference feature 40 on the exterior surface 11. Similar to method 300 above, the reference feature may be a passive strain indicator in some embodiments. The exemplary method 302 includes forming a replicate 50 of the reference feature 40 on the exterior surface 11 of the component 10 at step 311 and determining the initial condition of the reference 40 feature based on the replicate 50 at step 321. Method 302 further includes subjecting the component 10 to at least one duty cycle after determining the initial condition at step 332 and determining a subsequent condition of the reference feature 40 after the at least one duty cycle, while the component is in a service position. For example, in some embodiments, the subsequent condition of the component may be determined using a borescope tool 130, which in various embodiments may include a data acquisition device 140, e.g., to remotely view or to capture an image of the reference feature 40 in the subsequent condition. In at least some embodiments, method 302 may further include comparing the replicate 50 of the reference feature 40 to the subsequent condition of the reference feature 40. In various exemplary embodiments, such comparison may include physically superimposing the replicate 50 on the reference feature 40 or may include placing the replicate 50, e.g., a two-dimensional image or an impression formed in mold putty, proximate to the reference feature 40 for comparison.

Figure 15:
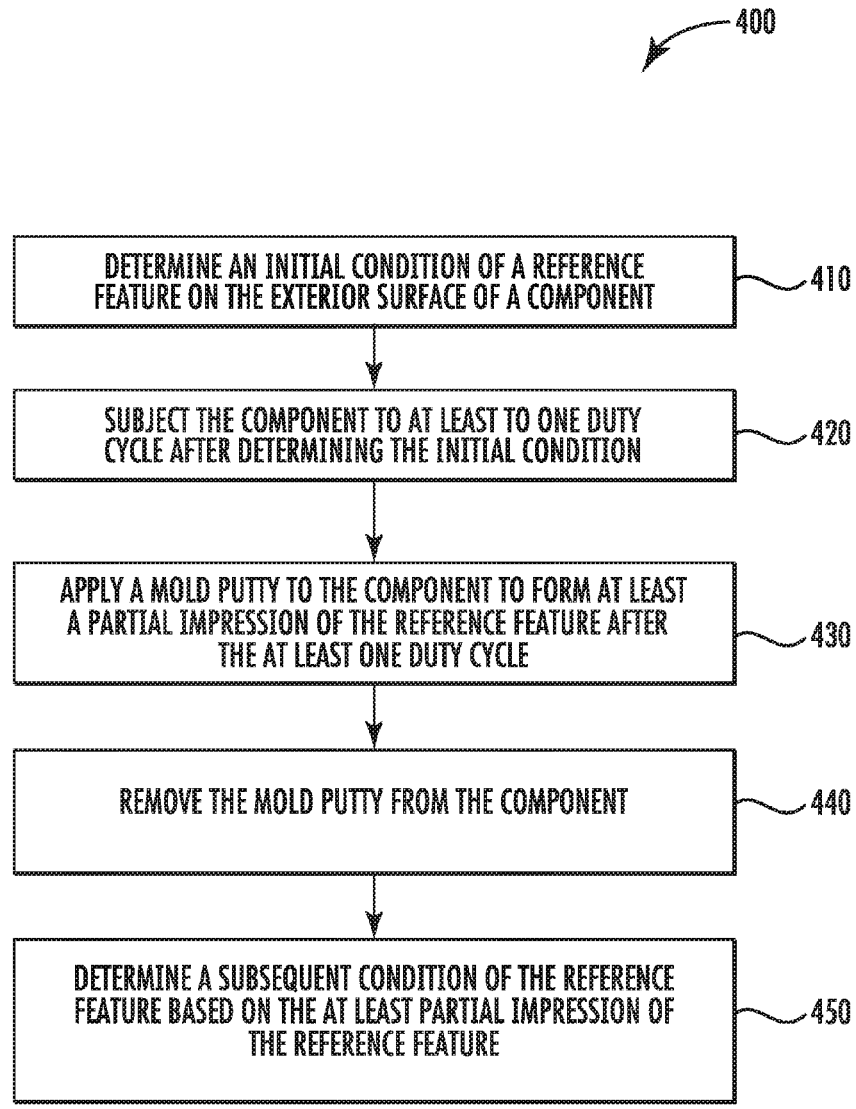
FIG. 15 is a flow chart illustrating a method for evaluating a component in accordance with one or more embodiments of the present disclosure.

FIG. 15 illustrates another exemplary method 400 for evaluating a component 10 of a turbomachine 100, wherein the component 10 has an exterior surface 11 with a reference feature 40 on the exterior surface 11. The exemplary method 400 includes determining an initial condition of the reference feature 40 at step 410, subjecting the component 10 to at least one duty cycle at step 420, applying a mold putty 214 to the component 10 with an injector tool 202, so that at least a portion of the reference feature 40 is covered by the putty 214 and at least a partial impression 50 of the reference feature 40 is formed in the mold putty 214 and step 430, removing the mold putty 214 from the component 10 at step 440, and determining a subsequent condition of the reference feature 40 based on the at least partial impression 50 of the reference feature 40 at step 450. For example, as discussed above, the impression 50 may be removed from the component 10 and the turbomachine 100 and scanned at a separate location while the component 10 and the turbomachine 100 remain in service.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for evaluating a component, the component having an exterior surface with a reference feature on the exterior surface, the method comprising:
    determining an initial condition of the reference feature;
    subjecting the component to at least one duty cycle after determining the initial condition;
    determining a subsequent condition of the reference feature after the at least one duty cycle, while the component is in a service position; and
    forming a replicate of the reference feature while the reference feature is in one of the initial condition or the subsequent condition;
    wherein one of the step of determining the initial condition of the reference feature or the step of determining the subsequent condition of the reference feature is based on the replicate of the reference feature.

2. The method of claim 1, further comprising comparing the subsequent condition of the reference feature to the initial condition of the reference feature by comparing the replicate of the reference feature to the other of the initial condition of the reference feature or the subsequent condition of the reference feature.

3. The method of claim 2, wherein the step of forming the replicate comprises forming the replicate of the reference feature in the initial condition prior to the step of subjecting the component to at least one duty cycle, and wherein the step of determining the subsequent condition of the reference feature comprises placing the replicate proximate to the reference feature and creating an image of the reference feature and the replicate, and wherein the comparing step comprises comparing the reference feature to the replicate based on the image of the reference feature and the replicate.

4. The method of claim 1, wherein the step of forming the replicate comprises forming an impression of the reference feature in a putty while the reference feature is in the initial condition prior to the step of subjecting the component to at least one duty cycle, and the step of determining the subsequent condition of the reference feature comprises determining whether the reference feature fits the impression.

5. The method of claim 1, wherein the step of forming the replicate comprises forming an impression of the reference feature in a putty while the reference feature is in the subsequent condition.

6. The method of claim 5, wherein the step of determining the subsequent condition of the reference feature comprises scanning the replicate.

7. The method of claim 6, further comprising comparing the subsequent condition of the reference feature to the initial condition of the reference feature by comparing the scan of the replicate to the initial condition of the reference feature.

8. The method of claim 1, wherein the step of forming the replicate comprises creating an image of the reference feature.

9. The method of claim 8, wherein the step of forming the replicate comprises scanning the reference feature with a digital laser scanner to create a three-dimensional image of the reference feature.

10. The method of claim 8, wherein the step of forming the replicate comprises creating a two-dimensional image of the reference feature.

11. The method of claim 10, wherein the two-dimensional image is of the reference feature in the initial condition, the two-dimensional image is a first two-dimensional image, and the step of determining the subsequent condition of the reference feature comprises placing the first two-dimensional image proximate to the reference feature after the step of subjecting the component to at least one duty cycle and creating a second two-dimensional image of the reference feature and the first two-dimensional image.

12. The method of claim 11, further comprising comparing the subsequent condition of the reference feature to the initial condition of the reference feature based on the second two-dimensional image.

13. The method of claim 1, wherein the step of forming the replicate comprises forming a first replicate of the reference feature in the subsequent condition, and the method further comprises forming a second replicate of the reference feature in the subsequent condition.

14. The method of claim 13, wherein the step of determining the subsequent condition comprises scanning the first replicate, scanning the second replicate, and averaging the results of both scans.

15. The method of claim 1, further comprising designing the component to have a predetermined initial condition of the reference feature, wherein the step of determining the initial condition comprises measuring the condition of the reference feature prior to subjecting the component to at least one duty cycle and determining the initial condition based on both the measured condition and the predetermined condition.

16. A method for evaluating a component of a turbomachine, the component having an exterior surface with a reference feature on the exterior surface, the method comprising:
determining an initial condition of the reference feature;
subjecting the component to at least one duty cycle;
applying a mold putty to the component with an injector tool, so that at least a portion of the reference feature is covered by the putty and at least a partial impression of the reference feature is formed in the mold putty;
removing the mold putty from the component; and
determining a subsequent condition of the reference feature based on the at least partial impression of the reference feature.

17. The method of claim 16, further comprising comparing the subsequent condition of the reference feature to the initial condition of the reference feature.

18. The method of claim 16, further comprising identifying a target area of the component for analysis, the target area including at least a portion of the reference feature, and wherein applying a mold putty to the component comprises applying a mold putty to the target area.

19. The method of claim 16, further comprising covering the applied mold putty with a shell, and applying pressure to the putty to allow the putty to cure.

20. The method of claim 16, wherein applying a mold putty comprises using a borescope device to apply the mold putty while the component is in a service position.

21. The method of claim 16, wherein the impression of the reference feature is of the initial condition.

22. The method of claim 21, wherein the subsequent condition is determined by physically superimposing the impression on the reference feature.

23. The method of claim 21, wherein the subsequent condition is determined by placing the impression proximate to the reference feature, further comprising creating an image of the impression and the reference feature and comparing the subsequent condition of the reference feature to the impression based on the image.

24. The method of claim 16, wherein the impression of the reference feature is of the subsequent condition, and determining the subsequent condition of the reference feature comprises scanning the impression.

25. The method of claim 16, wherein the turbomachine is a gas turbine.

* * * * *